(12) United States Patent
Curtis et al.

(10) Patent No.: US 10,430,767 B2
(45) Date of Patent: Oct. 1, 2019

(54) MEDIA LIFE CYCLE MANAGEMENT SYSTEM

(71) Applicant: Arch Holdings, LP, Carrollton, TX (US)

(72) Inventors: James R. Curtis, Carrollton, TX (US); John Laspia, III, Carrollton, TX (US)

(73) Assignee: ARCH HOLDINGS, LP, Carrollton, TX (US)

( * ) Notice: Subject to any disclaimer, the term of this patent is extended or adjusted under 35 U.S.C. 154(b) by 0 days.

(21) Appl. No.: 15/604,190

(22) Filed: May 24, 2017

(65) Prior Publication Data

US 2018/0341929 A1 Nov. 29, 2018

(51) Int. Cl.
| | | |
|---|---|---|
| G06Q 10/00 | (2012.01) |
| G06Q 40/00 | (2012.01) |
| G07F 7/06 | (2006.01) |
| G06Q 30/02 | (2012.01) |
| G06Q 10/08 | (2012.01) |

(52) U.S. Cl.
CPC ............. *G06Q 10/30* (2013.01); *G06Q 40/12* (2013.12); *G07F 7/06* (2013.01); *G06Q 10/087* (2013.01); *G06Q 30/0283* (2013.01)

(58) Field of Classification Search
None
See application file for complete search history.

(56) References Cited

U.S. PATENT DOCUMENTS

| | | |
|---|---|---|
| 4,910,675 A | 3/1990 | Burns et al. |
| 5,046,305 A | 9/1991 | Skubic et al. |
| 5,206,814 A | 4/1993 | Cahlander et al. |
| 5,210,729 A | 5/1993 | Schmidt et al. |
| 5,247,407 A | 9/1993 | Schimidt |
| 5,265,966 A | 11/1993 | Schmidt |
| 5,351,466 A | 10/1994 | Lee |
| 5,415,519 A | 5/1995 | Lee et al. |
| 5,421,950 A | 6/1995 | Parrish |
| 5,542,768 A | 8/1996 | Rother et al. |
| 5,679,944 A | 10/1997 | Cusey et al. |
| 5,734,629 A | 3/1998 | Lee et al. |
| 5,892,900 A | 4/1999 | Ginter et al. |

(Continued)

FOREIGN PATENT DOCUMENTS

| | | |
|---|---|---|
| CN | 101207782 | 6/2008 |
| CN | 2008140215 | 6/2008 |
| WO | 2012100239 A2 | 7/2012 |

OTHER PUBLICATIONS

SEMSHRED, Information Destruction Resource Guide, 12 pages, Westborough, MA.

(Continued)

*Primary Examiner* — Fateh M Obaid

(74) *Attorney, Agent, or Firm* — David W. Carstens; Stephens Y. Liu; Carstens & Cahoon, LLP

(57) ABSTRACT

A system and method for media destruction utilizing a kiosk. The system and method comprises a kiosk that allows a user to submit a plurality of media items to the kiosk for verification and destruction and then the destruction of the item is reported to the appropriate entity. The accounting subsystem generates reports and tracks the royalty reimbursement received from entities based on the media destroyed. The destroyed media is then recycled.

19 Claims, 15 Drawing Sheets

(56) References Cited

U.S. PATENT DOCUMENTS

| | | | |
|---|---|---|---|
| 5,914,918 A | 6/1999 | Lee et al. | |
| 5,946,216 A | 8/1999 | Hollerich | |
| 6,041,703 A | 3/2000 | Salisbury et al. | |
| 6,092,105 A | 7/2000 | Goldman | |
| 6,141,298 A | 10/2000 | Miller | |
| 6,220,640 B1 | 4/2001 | Jensen et al. | |
| 6,226,618 B1 | 5/2001 | Downs et al. | |
| 6,321,649 B1 | 11/2001 | Vangen et al. | |
| 6,321,983 B1* | 11/2001 | Katayanagi | G06Q 10/06 235/380 |
| 6,532,201 B1 | 3/2003 | Hogan | |
| 6,655,580 B1 | 12/2003 | Ergo et al. | |
| 6,748,539 B1 | 6/2004 | Lotspiech | |
| 6,760,053 B2 | 7/2004 | Rother | |
| 6,778,201 B2 | 8/2004 | Rother | |
| 6,827,509 B2 | 12/2004 | Suden et al. | |
| 6,848,113 B2 | 1/2005 | Klein | |
| 6,957,746 B2 | 10/2005 | Martin et al. | |
| 7,014,108 B2 | 3/2006 | Sorenson et al. | |
| 7,092,320 B1 | 8/2006 | Lee et al. | |
| 7,108,171 B1* | 9/2006 | Ergo | G06Q 30/02 235/375 |
| 7,127,725 B2 | 10/2006 | Lee | |
| 7,305,684 B2 | 12/2007 | Klein | |
| 7,311,367 B2 | 12/2007 | Salisbury et al. | |
| 7,331,521 B2 | 2/2008 | Sorenson et al. | |
| 7,448,051 B2 | 11/2008 | Nelson et al. | |
| 7,487,129 B2* | 2/2009 | Doll-Steinberg | G06F 21/10 705/51 |
| 7,494,048 B2 | 2/2009 | Gusler et al. | |
| 7,530,083 B2 | 5/2009 | Benedikt et al. | |
| 7,536,324 B2 | 5/2009 | Perkowski | |
| 7,748,619 B2 | 7/2010 | Martin et al. | |
| 7,774,233 B2 | 8/2010 | Barber et al. | |
| 7,815,071 B2 | 10/2010 | Martin et al. | |
| 7,860,606 B2 | 12/2010 | Rudy | |
| 7,865,432 B2 | 1/2011 | Doran et al. | |
| 8,024,272 B2 | 9/2011 | Doran et al. | |
| 8,033,375 B2 | 10/2011 | Doran et al. | |
| 8,038,059 B2 | 10/2011 | Martin et al. | |
| 8,095,236 B2 | 1/2012 | Rudy et al. | |
| 8,103,586 B2 | 1/2012 | Doran et al. | |
| 8,162,383 B2 | 4/2012 | Curtis | |
| 8,229,851 B2 | 7/2012 | Doran et al. | |
| 8,332,313 B2 | 12/2012 | Doran et al. | |
| 8,482,413 B2 | 7/2013 | Martin | |
| 8,550,294 B2 | 10/2013 | Martin | |
| 8,682,715 B1 | 3/2014 | Cedeno | |
| 8,726,010 B2 | 5/2014 | Mathur et al. | |
| 8,760,296 B2 | 6/2014 | Martin | |
| 8,874,467 B2 | 10/2014 | Yahn et al. | |
| 8,935,532 B2 | 1/2015 | Mittal et al. | |
| 8,965,570 B2 | 2/2015 | Rudy | |
| 9,064,268 B2 | 6/2015 | Larrick et al. | |
| 9,227,800 B2 | 1/2016 | Martin | |
| 9,233,812 B2 | 1/2016 | Martin et al. | |
| 9,245,310 B2 | 1/2016 | Zhao et al. | |
| 9,290,338 B2 | 3/2016 | Martin et al. | |
| 9,704,127 B2* | 7/2017 | Bock | G06Q 30/012 |
| 2001/0029583 A1 | 10/2001 | Palatov et al. | |
| 2002/0035515 A1 | 3/2002 | Moreno | |
| 2002/0095680 A1 | 7/2002 | Davidson | |
| 2003/0135465 A1 | 7/2003 | Lee et al. | |
| 2003/0177928 A1 | 9/2003 | Harris | |
| 2003/0182156 A1* | 9/2003 | Bock | G06Q 30/012 705/1.1 |
| 2004/0034785 A1 | 2/2004 | Tai et al. | |
| 2004/0254940 A1* | 12/2004 | Brush | G06Q 30/06 |
| 2005/0018216 A1 | 1/2005 | Barsness et al. | |
| 2005/0049931 A1 | 3/2005 | Wisnudel et al. | |
| 2005/0071045 A1 | 3/2005 | Clini | |
| 2005/0076020 A1 | 4/2005 | Huntley et al. | |
| 2005/0096936 A1 | 5/2005 | Lambers | |
| 2005/0102191 A1 | 5/2005 | Heller | |
| 2005/0114205 A1 | 5/2005 | Nelson et al. | |
| 2005/0125355 A1* | 6/2005 | Fein | G06F 21/10 705/57 |
| 2005/0149446 A1 | 7/2005 | Le Pannerer et al. | |
| 2005/0172122 A1 | 8/2005 | Risan et al. | |
| 2005/0213489 A1 | 9/2005 | Jensen et al. | |
| 2005/0213491 A1 | 9/2005 | Nelson et al. | |
| 2005/0213492 A1 | 9/2005 | Jensen et al. | |
| 2005/0213493 A1 | 9/2005 | Nelson et al. | |
| 2005/0213494 A1 | 9/2005 | Nelson et al. | |
| 2005/0227773 A1 | 10/2005 | Lu et al. | |
| 2006/0011716 A1 | 1/2006 | Perkowski | |
| 2006/0028398 A1 | 2/2006 | Willmore | |
| 2006/0036549 A1 | 2/2006 | Wu | |
| 2006/0074679 A1 | 4/2006 | Pifer et al. | |
| 2006/0235755 A1 | 10/2006 | Meuller | |
| 2006/0235864 A1 | 10/2006 | Hotelling et al. | |
| 2006/0259426 A1 | 11/2006 | Blama | |
| 2007/0067340 A1 | 3/2007 | Lakamp et al. | |
| 2007/0214369 A1 | 9/2007 | Roberts et al. | |
| 2007/0228162 A1 | 10/2007 | Phillips | |
| 2007/0260640 A1* | 11/2007 | Hamilton, II | G06Q 10/04 |
| 2007/0282747 A1 | 12/2007 | Shen et al. | |
| 2008/0005025 A1 | 1/2008 | Legere et al. | |
| 2008/0005802 A1 | 1/2008 | Fierstein et al. | |
| 2008/0046122 A1 | 2/2008 | Manzo et al. | |
| 2008/0071587 A1 | 3/2008 | Granucci et al. | |
| 2008/0082688 A1 | 4/2008 | Yi et al. | |
| 2008/0103974 A1 | 5/2008 | Fridhendler et al. | |
| 2008/0189390 A1 | 8/2008 | Heller et al. | |
| 2008/0201386 A1 | 8/2008 | Maharajh et al. | |
| 2008/0250120 A1* | 10/2008 | Mick | G06F 21/10 709/219 |
| 2008/0255901 A1 | 10/2008 | Carroll et al. | |
| 2009/0070122 A1 | 3/2009 | Hauck et al. | |
| 2009/0117846 A1 | 5/2009 | Mavrakakis | |
| 2009/0154899 A1 | 6/2009 | Barrett et al. | |
| 2009/0193153 A1 | 7/2009 | Thanos | |
| 2009/0204855 A1 | 8/2009 | Peters | |
| 2009/0276087 A1 | 11/2009 | Murray et al. | |
| 2009/0325602 A1 | 12/2009 | Higgins et al. | |
| 2010/0057563 A1 | 3/2010 | Rauber | |
| 2010/0070610 A1 | 3/2010 | Buttars | |
| 2010/0088192 A1 | 4/2010 | Bowles et al. | |
| 2010/0169652 A1 | 7/2010 | Butler | |
| 2010/0198726 A1 | 8/2010 | Doran | |
| 2010/0221938 A1 | 9/2010 | Liu | |
| 2010/0250347 A1 | 9/2010 | Rainier et al. | |
| 2011/0015934 A1 | 1/2011 | Rowe et al. | |
| 2011/0093622 A1 | 4/2011 | Hahn et al. | |
| 2011/0099104 A1 | 4/2011 | Nybom | |
| 2011/0161409 A1 | 6/2011 | Nair et al. | |
| 2011/0231273 A1 | 9/2011 | Buchheit | |
| 2011/0314153 A1 | 12/2011 | Bathiche et al. | |
| 2012/0004770 A1 | 1/2012 | Ooyen et al. | |
| 2012/0011540 A1 | 1/2012 | Pullford | |
| 2012/0033537 A1 | 2/2012 | Hassler et al. | |
| 2012/0109787 A1 | 5/2012 | Larrick et al. | |
| 2012/0150343 A1 | 6/2012 | Baric | |
| 2012/0330152 A1 | 12/2012 | Reisinger et al. | |
| 2013/0091055 A1 | 4/2013 | Doran et al. | |
| 2013/0191170 A1 | 7/2013 | Jarrett | |
| 2013/0297431 A1 | 11/2013 | Deubell et al. | |
| 2014/0136351 A1 | 5/2014 | Lennon | |
| 2014/0208122 A1 | 7/2014 | Mathur et al. | |
| 2015/0278801 A1 | 10/2015 | Friedlander | |
| 2015/0294318 A1 | 10/2015 | Hui et al. | |
| 2015/0317619 A1 | 11/2015 | Curtis | |
| 2016/0155208 A1 | 6/2016 | Zhao et al. | |

OTHER PUBLICATIONS

Kalediescape Conductor, Feb. 8, 2008; www.kaleidescape.com.
Brad Stone, "Software That Copies DVDs Is On Trial", Apr. 24, 2009; http://www.nytimes.com/2009-04-24technology/2...html?_r=2&partner=rss&emc=rss&pagewanted=print.
"Kaleidescape 1080p Player, KPLAYER-6000"; Apr. 13, 2009.
Chris Albrecht, "MOD Systems Sees Video delivery Via SD Cards", Jan. 8, 2009.

(56) References Cited

OTHER PUBLICATIONS

Mod Systems Corporate Backgrounder, Jan. 2009.
Object Storae: A Dell Point of View; Dell Inc., Round Rock, Texas, USA, Dec. 9, 2010; 11 pp.
VCAS Verimatrix Content Security Manager; Verimatrix, Inc.; San Diego, CA, USA; Aug. 29, 2010; 2 pp.
VCAS Verimatrix ViewRight STB for IPTV; Verimatrix, Inc.; San Diego, CA, USA; Aug. 29, 2010; 2 pp.
Panasonic Ideas for Life, http://www2.panasonic.com/consumer-electronics/shop/Video/Blu-ray-Disc-Players/model . . . .

\* cited by examiner

MEDIA LIFE CYCLE MANAGEMENT SYSTEM

BACKGROUND

1. Field of the Disclosure

The management of media product life cycles and more specifically the management of all physical and digital media (disc, file, or cartridge) life cycles through destruction or end of life of the media and reporting the destruction to the studio for royalty reimbursement.

2. Background

In the constantly changing world of all digital media, DVDs and other media disc systems are becoming obsolete at a growing rate. As a result, DVDs, Blu-rays, and CDs are now returned to stores because the media has either already been purchased or is stored in the digital cloud. However, this creates an issue when stores receive returned media items and, in particular, those media items that have been opened. Often these media items cannot be resold unless the retailer has a secondary or open box market or policy. Therefore, the retailer is left with a loss for that media item resulting in a major issue for the budgets of retailer entertainment departments. There is also the issue of media items that arrive at the retailer damaged in transit. If the media cannot be resold, it must be destroyed and verification of the destruction/unplayability is required in order for the store to receive a return on the royalty payment paid to the movie, recording, or software production studio. Similarly, if media items cannot be resold due to being opened or damaged after purchase, then they must also be destroyed in order for the retailer to recover the royalty that was paid or reverse the studio "pay on scan" process. Thus, a system for media inventory management is required that can automate the process and reduce the millions of dollars that retailers spend to manage their inventory of media items and also reduce the internal shrink associated with taking live product off the shelf. There is a measurable number of the amount of shrink of product from the time it's removed from the shelf to the time the product actually makes it to the studio return facility.

Traditional systems and methods have required the store to manually return the media to the studio for credit and in some instances destroy the media. This manual operation to return the media to the studio is slow and inaccurate and creates an opportunity for internal shrink and loss. In many cases, the media is not destroyed in a manner that renders it unreadable, unplayable or unusable. A manual destruction policy can create several potential problems, especially if an employee cannot be monitored during the process. The destruction must also be documented and reported in a detailed manner in order for a studio to grant repayment of the royalty. Again, issues are created when an employee fails to document the destruction properly or generate the proper report.

BRIEF SUMMARY

Disclosed is a media life cycle management system for the implementation and reporting of media destruction. The media destruction allows a retailer to recover the prepaid or pay on scan royalties from the media production studios, whether it is a movie, music, software, or video game. These prepaid or pay on scan royalty payments can be returned or credited to the retail store if they can provide verification and proof of media destruction or unplayability.

The return/credit of the royalty payment and proof of destruction can be an issue for many retail stores to prove and appropriately prepare documentation for the studio. The proof and documentation requirement is one of the problems that exemplary embodiments of the present invention solve. The present invention in an exemplary embodiment performs the destruction of the media in a manner to make it unusable and unreadable, while also recording proof of the media destruction. Studios look for the media item to be unusable and unreadable when providing reimbursement of the royalty payment.

In order to determine the specific studio, and thus what formatting and reporting setup to use the system, in one embodiment, must also read the media, and in some cases record pictures or video of any visible identifying marks or serial numbers. The identifying data read from the media, the pictures and/or video can then be saved locally or remotely. From the local or remote storage, a report generation system can prepare a report for each studio related to the media in the proper or preferred format, alleviating human error.

In certain embodiments, a user can provide the media item and, prior to destruction, it can also be exchanged if it is readable. Many times this kiosk will only be used by retailer employees, however, a media trade-in kiosk could also utilize the destruction subsystem for those media items that are deemed unreadable. The kiosk can also be used by customer service to determine whether or not a return is actually defective. In random testing of customer returns, on average over 60% is not actually damaged as the customer has reported as their reason for returning the product for refund. This gives the retailer the ability to validate a media's playability if this feature is so desired.

DETAILED DESCRIPTION

Disclosed is a retail operation friendly media management kiosk system for the destruction of media items, specifically the verified destruction and/or rendering unplayable of media items and reporting of said destruction/unplayability to the appropriate entity for reimbursement. The kiosk system utilizes a method and subsystem processes to achieve the destruction/unplayability and reporting. It would be understood that in some cases unplayability can be achieved without the destruction of the media item. In an exemplary embodiment of the present invention, the system comprises a kiosk with the ability to accept media items, verify their authenticity, determine the readability of the media item, determine the point of destruction that prevents any readability or usability of the media item, initiate destruction of the media item, record the destruction/unplayability of the media item, and generate reports of the destruction/unplayability. In cases where the media is determined to not be approved for destruction through established protocols and database listings, the media item can be sent to a recycle or storage bin/hopper thus allowing the media item to be retrieved at a later time or date.

Figure 1:
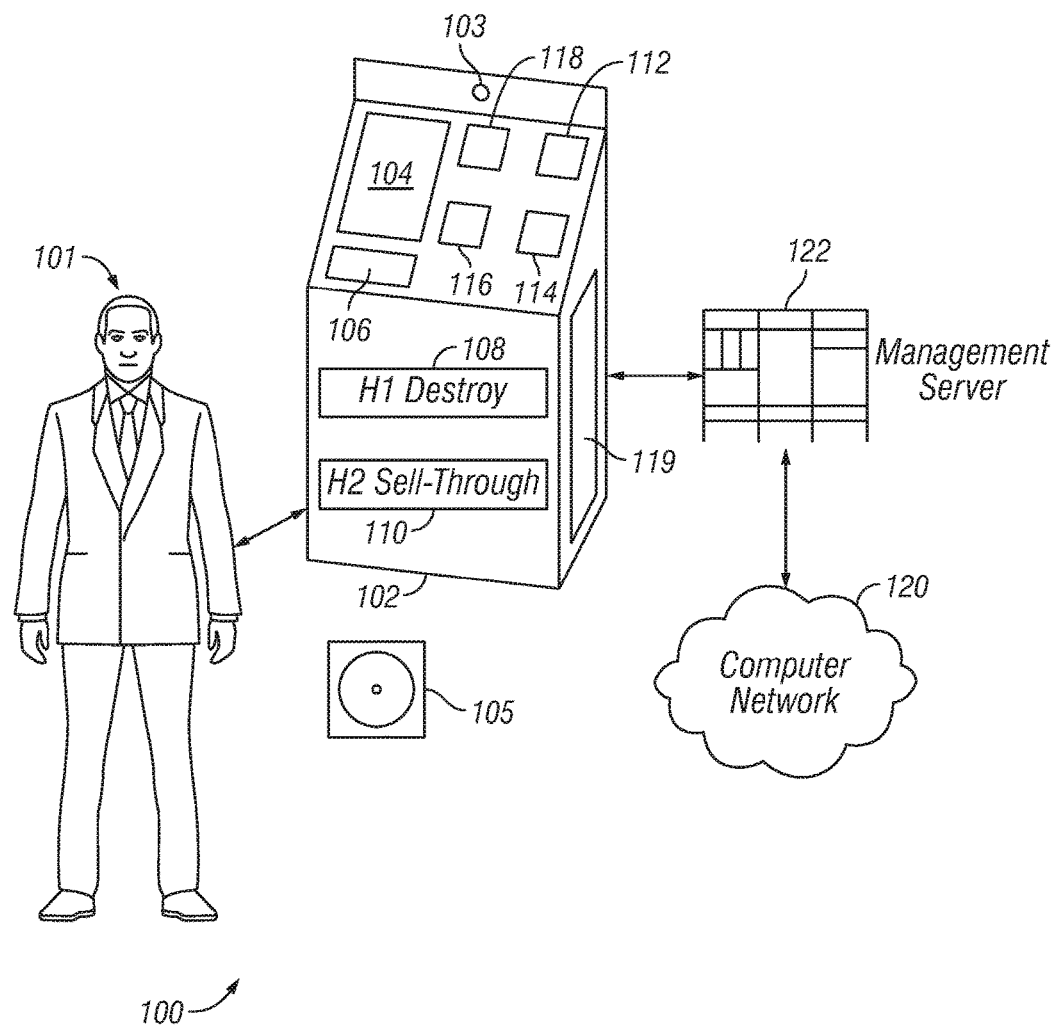
FIG. 1 illustrates a perspective view of the media destruction kiosk system.

FIG. 1 illustrates the media destruction kiosk system 100 that allows a user 101 to provide media items for destruction/unplayability which include but are not limited to, movies, audio recordings, video games, and software. The movies, audio recordings, video games, and software can be comprised of, but not limited to, optical discs such as CDs, DVDs, Blu-rays, HD-DVDs, mini-discs, as well as USB drives, SD cartridges, mini-drives, hard drives, cartridges, and all memory cards and mediums.

Each kiosk 102 is a standalone system, of a rectangular design that includes a square base, a rectangular front, and a rearward tilting face that includes a display 104. The kiosk 102 encloses the internal operational components of the system. The display 104 can be a touchscreen or other manner of display with a user input device 106 for interfacing with the user 101. A camera 103 is also available above the display 104 to allow the user to interface with live support throughout their experience as needed. The display 104 and the user input device 106 allows a user 101 to access the kiosk interface. The user input device 106 can include, but is not limited to, a touchpad, a keyboard, a trackball, or a computer mouse. Along the rectangular front portion of the kiosk 102, are a plurality of slots or openings such as a first media acceptance slot 108, and second media acceptance slot 110. The first media acceptance slot 108 and second media acceptance slot 110 can be used to accept media item 105. The first media acceptance slot 108 can lead to the destruction system, while the second media acceptance slot 110 can lead to a sell-through or recycle program. Additional slots or openings can be included in alternative embodiments that do not fall outside the scope of the invention and can include, but are not limited to, a receipt printer slot 112, a scanner slot 114, a card reader slot 116, and an initiate destruction button or emergency stop button 118. There is also the media item removal door 119 that allows a technician or service personnel to retrieve media items from the kiosk or make repairs to the internal components. It would be understood that these slots could be presented in a number of combinations, orders, and presentations, and are not limited by their description as a slot as the dimensions required for their purpose may change over time. Also these slots can be remotely enabled or disabled depending on the particular use case.

The kiosk can communicate with a computer network 120 through the management server 122. The management server 122, in combination with other components of the kiosk system, coordinate with the kiosk system 102. The management server 122 can be a part of the kiosk 102 or remotely connected to a server accessible through the computer network 120. The computer network 120 can be a private network, utilizing a hardwired or private wireless network, or a public network such as the internet. Thus, any network topology that allows the kiosk to interact with a centralized database and management operating center can be utilized by the computer network 120.

Figure 2A:
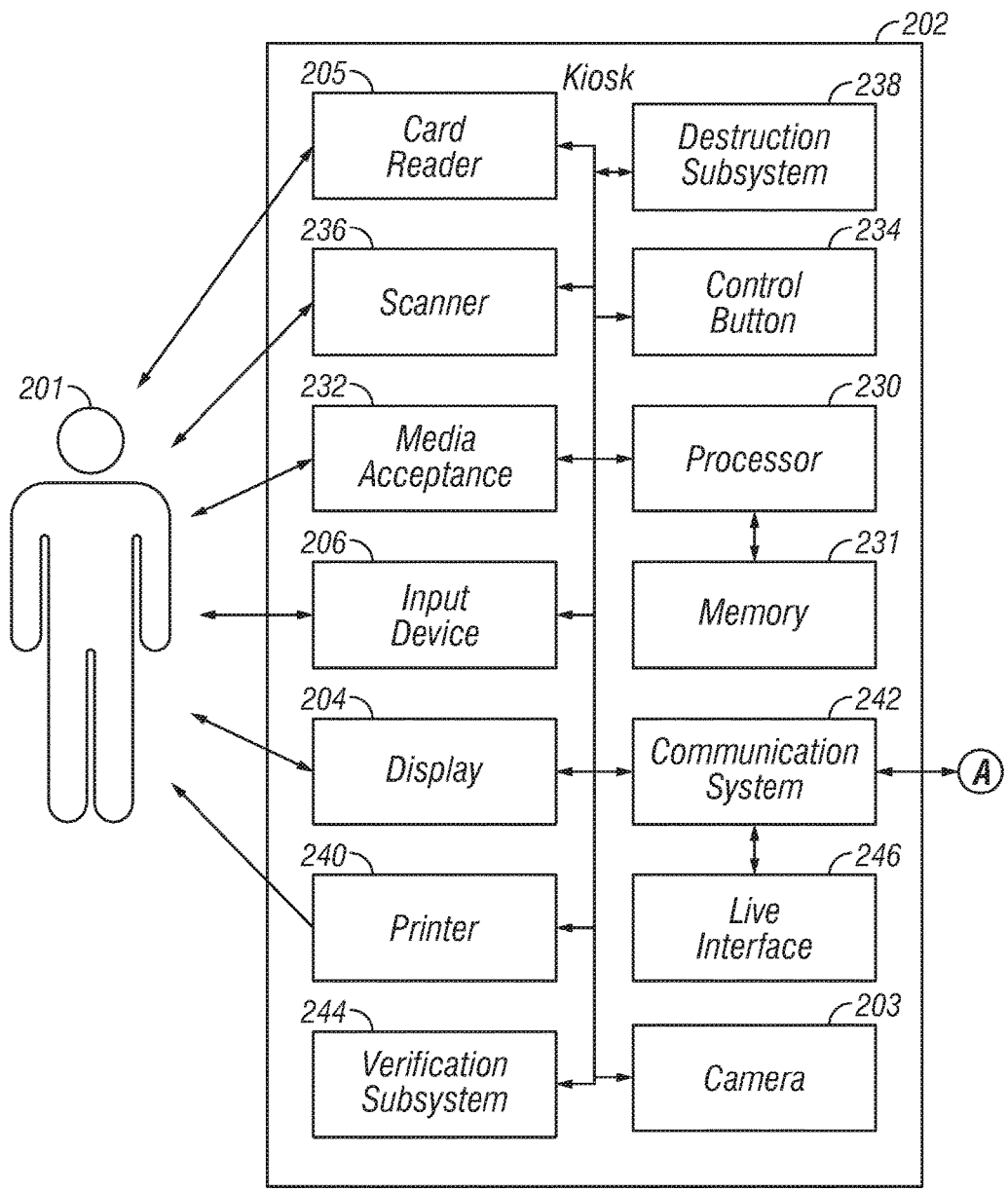
FIG. 2A shows a system level view of the media destruction kiosk system and network connections.
Figure 2A:
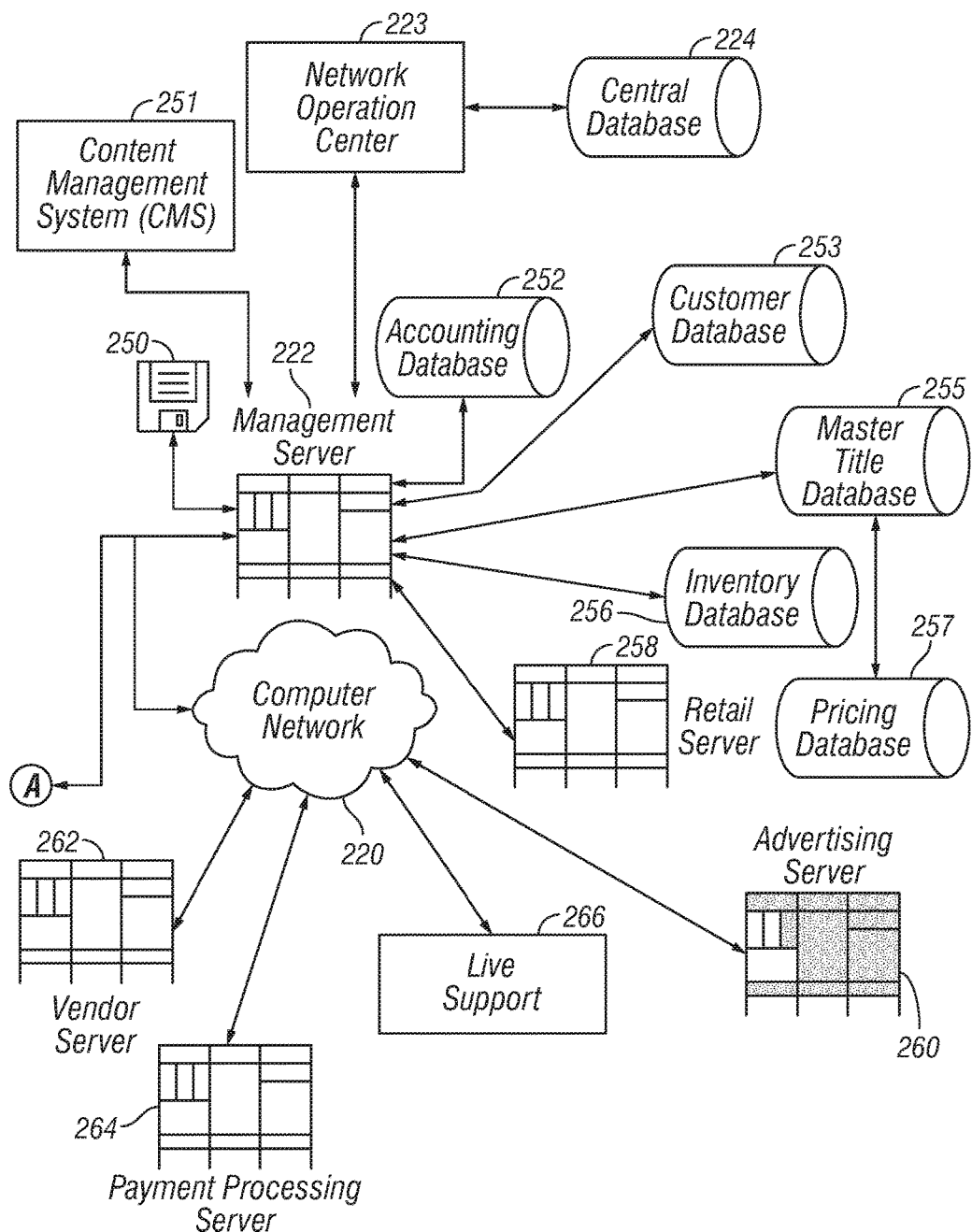

FIG. 2A shows the interconnectivity of the kiosk 202, the management server 222, and the computer network 220. Within the kiosk 202, is a processor 230 and a considerable amount of data storage capability for controlling various aspects of the kiosk 202. The processor 230 can also be connected to a multitude of buses, interfaces, or memory, both volatile and non-volatile. The processor 230 is connected to a communication system 242 that allows the processor 230 to connect to a variety of databases and servers, through systems such as, but not limited to, Local Area Networks (LAN), Wireless Local Area Networks (WLAN), the Internet, wired routers, wireless routers, wired or wireless network switches, wired or wireless modems, Bluetooth, Near Field Communications, and other methods on communication interfacing. The processor 230 connects with the display 204, and user input device 206, for receiving user input and feedback, as well as providing a user 201 with information regarding their media destruction. The processor 230 controls a media acceptance subsystem 232 that can receive a media item (not shown) from the user 201. The media acceptance subsystem 232, in a preferred embodiment, can utilize a series of mechanical devices, cameras, and light sources to capture and/or accept the media item. The mechanical devices can include gears, motors, actuators, tracks, and other known methods of mechanically or electro-mechanically receiving media items. Additionally, the media acceptance system can also provide for the acceptance of the associated packaging and media documentation. In alternative embodiments of the present invention, the associated packaging and media documentation can be placed in a separate recycling bin within the kiosk if they are unsatisfactory for reuse or are not needed for the associated media item destruction. Once the media acceptance subsystem 232 has received the media item, and then the processor 230 triggers the transfer of the media item to the media verification subsystem 244 for processing. The media verification subsystem 244 determines the viability and authenticity of the media item through known methods, specifically, an imaging system and a database that is updated from a central location and downloaded to all kiosks daily. The database can include media item identification characteristics, known identifying markings, media item data file information, media item security data files, and other media metadata item verification information. The media verification subsystem 244 utilizes optical, laser, and other methods of visual and contact analyses. These include, but are not limited to, pinhole or void verification along the media items as well as methods for authenticating the media item through checking for security data, symbols, and labels. Additionally, the media verification subsystem 244 can utilize data regarding security features employed on various titles, downloaded daily from a database and in an exemplary embodiment of the present invention, the database would be the master title database 255. Thus, media verification can be completed through physical and digital methods.

Figure 2B:
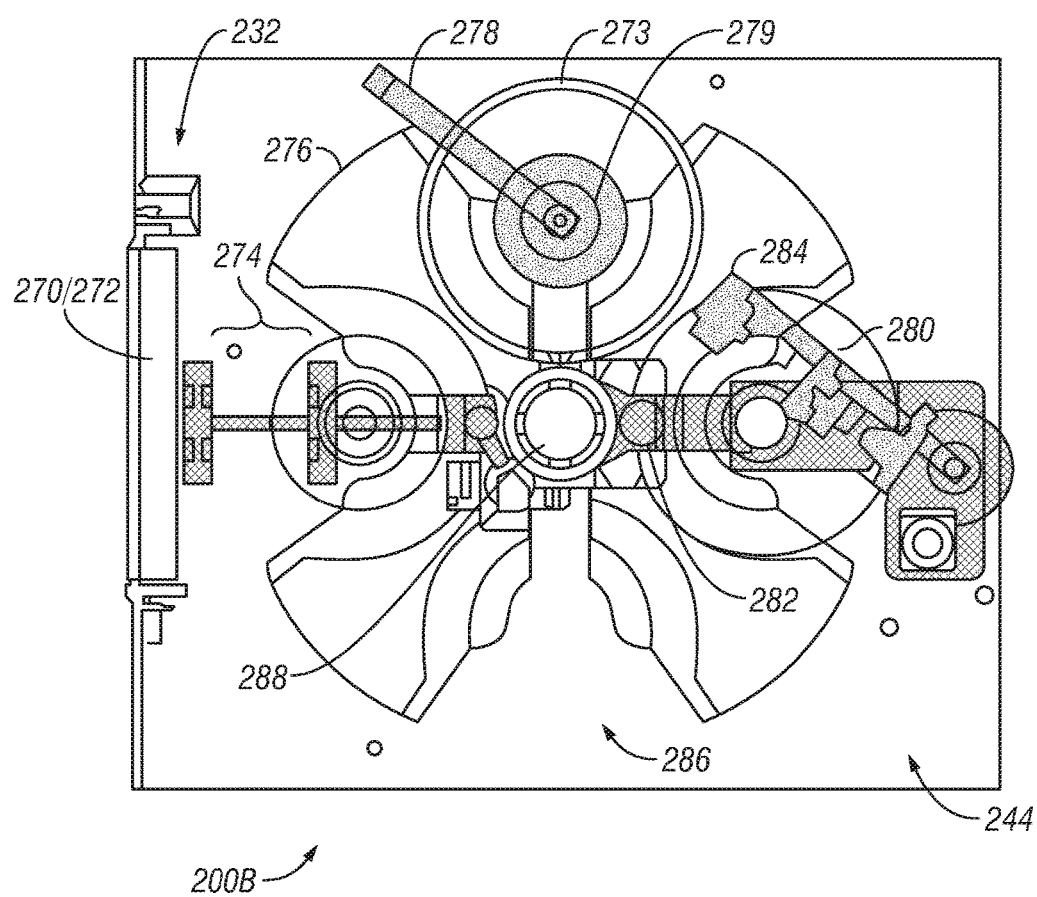
FIG. 2B shows a top view of the media item acceptance and verification subsystems.
Figure 2C:
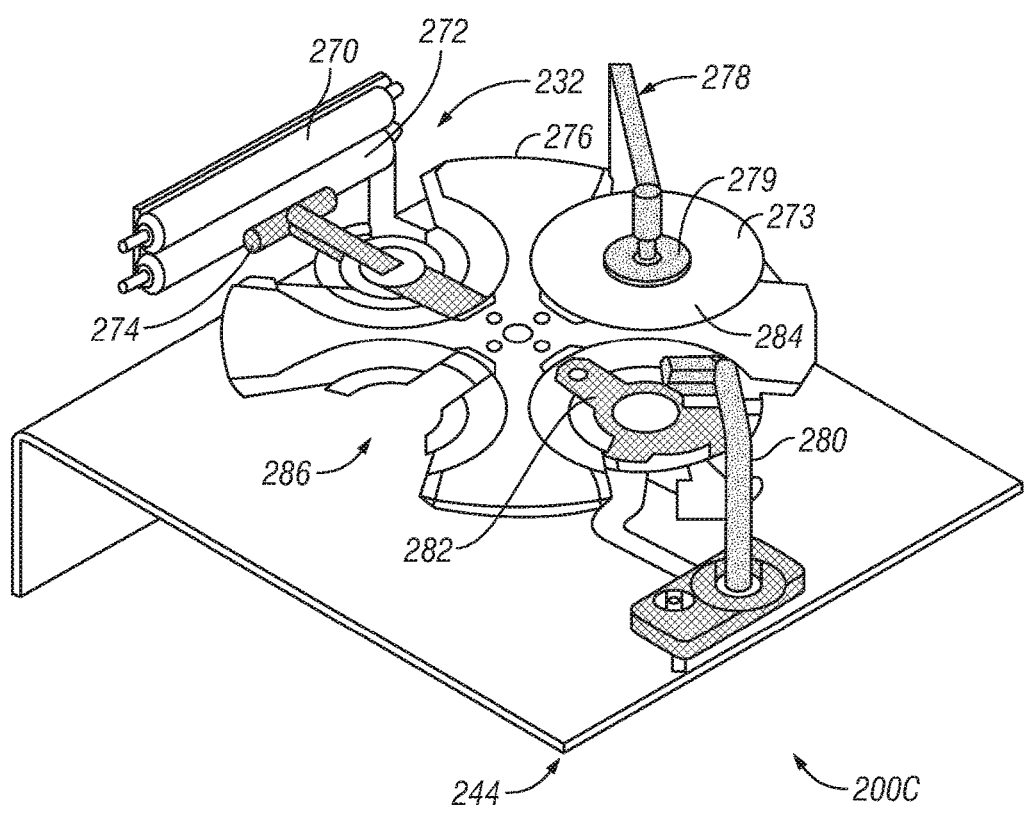
FIG. 2C shows a prospective view of the media item acceptance and verification subsystems.

In an exemplary embodiment, the media acceptance subsystem 232 can be directly associated with the verification subsystem 244 as seen in FIGS. 2B and 2C. FIG. 2B illustrates a top view 200B of the media acceptance subsystem 232 and the verification subsystem 244, while FIG. 2C shows a prospective view 200C of the media acceptance subsystem 232 and the verification subsystem 244. The media acceptance subsystem 232 allows the kiosk 202 to accept the media item 273 utilizing the upper support 270 and the lower support 272. The upper and lower supports 270 and 272 can be motorized or non-motorized in order to move the media item internally into or out of the kiosk 202. The upper support 270 and lower support 272 work in conjunction with the media acceptance slot 108. The supports would be made of a material, including, but not limited to, foam or cloth like materials that would not cause injury to the media item 273, and could be different shapes that can also allow for the movement of the media item within the kiosk 202. In alternative embodiments, the upper support 270 and lower support 272 would be fixed in place and use fibers or alternative shapes to clean or remove any additional material from the media item 273 as the kiosk 202, using a media transfer engager 274, receives it.

Once the media item 273 proportionally transverses the upper and lower supports 270 and 272, the media transfer engager 274 can engage with the media item in such a way as to transfer it from the upper and lower supports 270 and 272 to the carousel 276. The carousel is not limited to being only a carousal, it could also comprise a media tray, a media gripper, a media belt, or a media post system. The kiosk can also utilize a plurality of carousals in alternative embodiments. The media transfer engager 274 can include, but is not limited to, posts, hoppers, arms, fingers, disc media trays and other mechanical or electro-mechanical methods of receiving and capturing the media item 273, The carousel 276 moves the media item 273 through the stages of the verification subsystem 244. The carousel 276 is moved utilizing a combination of a motor and plurality of gears, fitted slides or belts 288. The plurality of gears or belts could also encompass other known methods of mechanical power transmission. The motor and plurality of gears 288 can include, but is not limited to, a stepper motor, a Direct Current motor, worm gears, intersecting gears, belts, or a combination thereof. It would be understood that the different stages could be placed in any number of combinations without departing from the spirit of the invention.

An authenticity and security elements stage 278 allows the media item 273 to be analyzed for authenticity and security elements. The authenticity stage performs analysis of the media item 273 through processes such as, but not limited to, reading the data on the disc, validating imbedded hologram if exists, and analyzing the disc for holographic or other security images on the disc, or reading the security data ring. At each stage of the verification subsystem 244, the media item 273 can be read by optical, laser, and other known methods of reading data such as, but not limited to, the rotation of a media disc to allow for optical or laser reading. The optical scanning unit 279 comprising an HD camera or other imaging system as part of the scanner that takes a digital picture of the hologram and then allows the processor to authenticate the media item 273 by verifying security markings such as holographic, images or labels along the surfaces of the media item 273.

The pinhole and physical damage stage 280 allows the media item 273 to be analyzed for gradient depth of the physical damage, scratch depth and readability. The pinhole and physical damage stage 280 also has an imaging and light emitting arm 282 that works in conjunction with the imaging and light detection head 284. The imaging and light emitting arm 282 captures images of the media item's readable surface as well as shining a light source on the media item surface. The imaging and light detection head 284 captures images of the readable surface of dual layer media items, while also moving with the imaging and light emitting arm 282 to determine if there are any pinhole or voids in the media item 273. The imaging and light emitting arm 282 can have the imaging and light detection head 284 both above and below the media item 273. This is to ensure that the readable surface of a media item 273 is captured. The imaging and light detection head 284 can include a plurality of high powered Light Emitting Diodes ("LEDs"), a high definition optical sensor capable of capturing still or video images, and a laser unit for measuring the gradient thickness of the media for damage such as deep scratches or worn areas that allow light through.

Figure 2D:
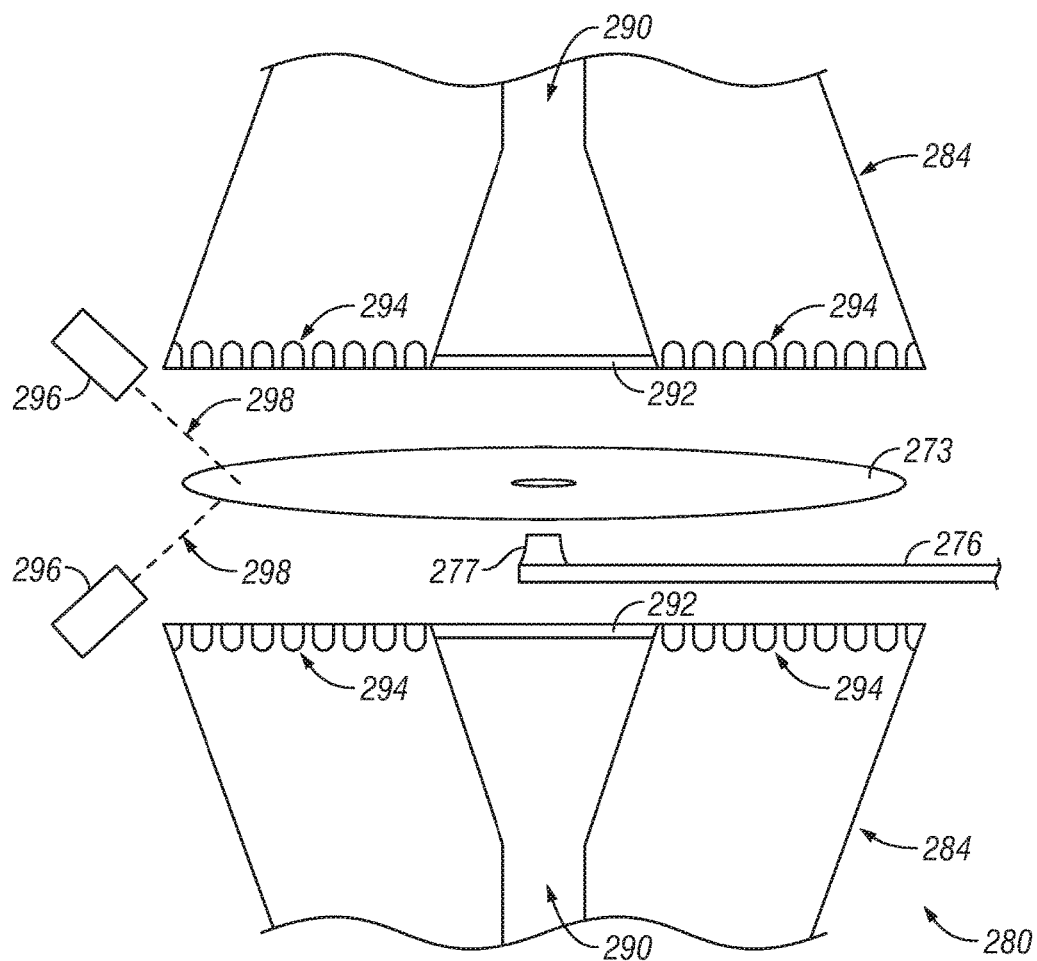
FIG. 2D illustrates a dual image, light detection and producing head for the physical and pinhole damage detection stage.
Figure 2E:
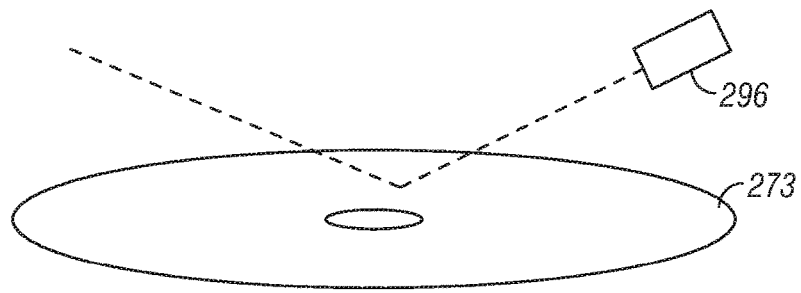
FIG. 2E illustrates a laser used to detect gradient damage and wear and tear of a media item.
Figure 2F:
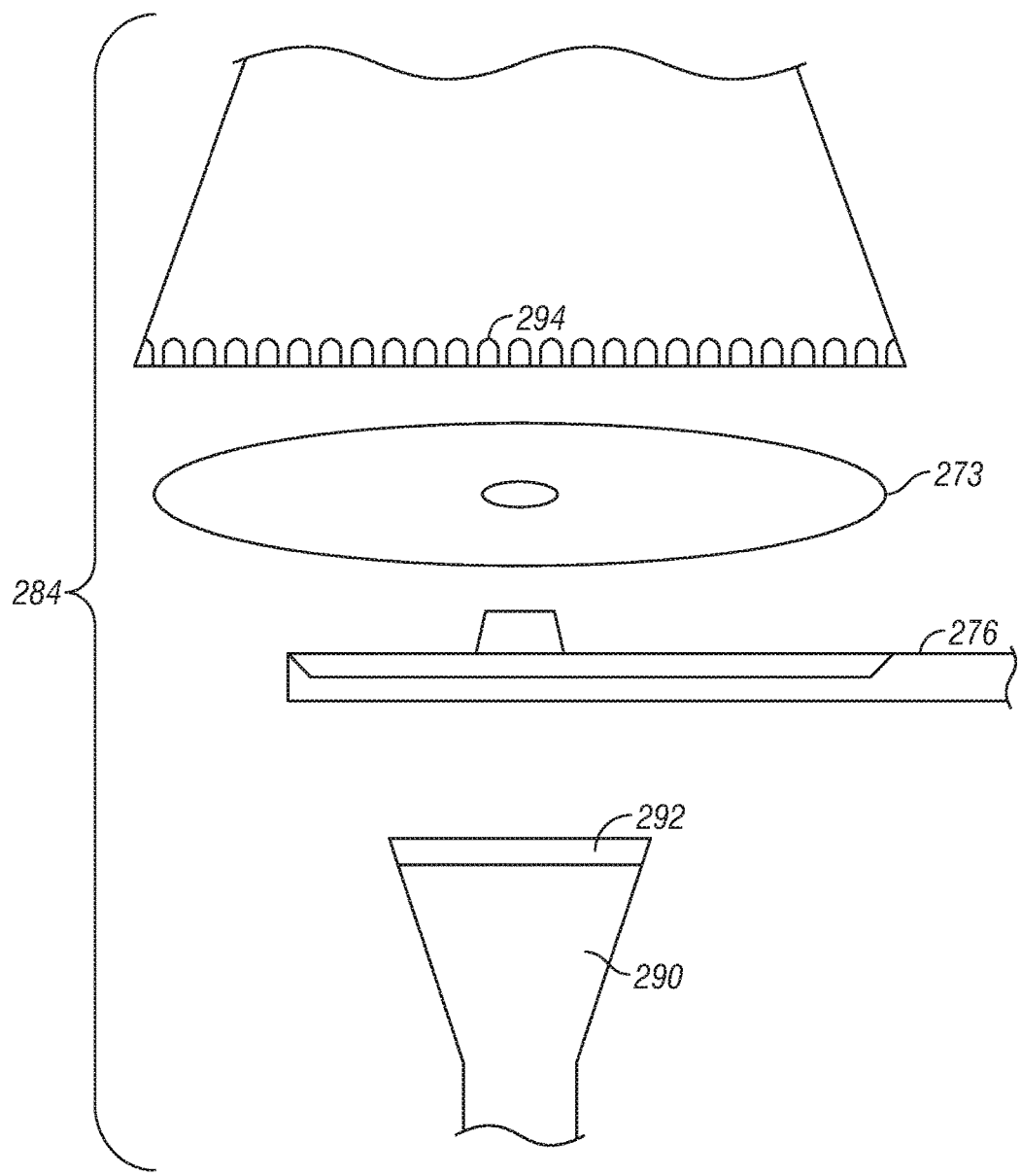
FIG. 2F illustrates a single image, light detection and producing head for the physical and pinhole damage detection stage.

FIG. 2D-2F illustrates a cutaway view of the pinhole and physical damage stage 280. In the exemplary embodiment a dual imaging and light detection head 284 and producing head is illustrated. It would be understood by someone skilled in the art that a single imaging and light detection head 284, or a split imaging and light detection head 284 and a light producing head like illustrated in FIG. 2F could be utilized as well. The dual image, light detection and producing head 284 can comprise an imaging unit 290, such as a high resolution or high definition camera capable of capturing still or video images. The imaging unit 290 also has a lens 292 that can be a fisheye or other wide angle lens that would allow the imaging unit 290 to capture the whole media item 273 with one recording or image. The head 284 also can comprise a plurality of high power or high intensity light emitting devices 294 such as LEDs or other light sources. These light emitting devices 294 allow the imaging unit 290 to capture an image that can be analyzed by the verification subsystem for any pinholes, voids, or other physical damages.

The carousel 276 can move the media item 273 after the verification stages to a storage position 286. In addition, the kiosk 202 could include a carousel with additional slots or a second carousel to store additional media items during a media trade in, allowing a user 201 to provide multiple media items for trade-in at one time. Similarly, for an embodiment, that includes the media item packaging and documentation receiving slots, similar media acceptance subsystems and verification systems to those describe above would be utilized.

The carousel 276 for the verification subsystem for use with packaging and documentation would utilize a tray system with glass or other transparent material such as a polycarbonate. A clear conveyor belt could also be utilized as well as an alternate to carousel 276. The mechanical, electro-mechanical, and electrical components are controlled via the processor 230. For USB drives or memory cards the memory acceptance subsystem can include a module that would read the device, if readable then it would be pulled into the kiosk for physical damage verification and media trade-in. The module would then be replaced with an empty module. Alternatively, the USB or memory card attachment system could be released from the kiosk 202 that connects securely to an internal storage area.

Returning to FIG. 2A upon successful verification of the media item with the media verification subsystem 244, the processor 230 can begin communications with the management server 222 via the communications system 242. The management server 222 can initiate an destruction subsystem process 800 (as described in FIG. 8) to destroy the media item. The accounting subsystem process 900 utilizes data from local or remote databases such as the accounting database 252, customer database 253, master title database 255, inventory database 256, and pricing database 257. The accounting subsystem process 900 utilizes data form the databases 252, 253, 255, 256 and 257 to generate reports, physical verification, and documentation. The customer database 253 allows customer profiles to be stored and retrieved, along with data regarding each user's transaction. For example, if a specific customer has continued to have bad media, a user may decide to allow the customer to receive the royalty reimbursement. The user 201 can decide to save the reimbursement they receive during the destruction, reporting, and accounting processes within the customer database 253 in a customer profile, which can be retrieved utilizing a plurality of customer identifiers such as, but not limited to, phone number, pin number, username, email, and passwords. In this case, the customer could be a person or an entity. In alternative embodiments the pricing database 257 and accounting database 252 can be incorporated into a single accounting and pricing database (not shown). The pricing database 257 is connected to the master title database 255. The pricing database 257 maintains the current retail pricing, suggested retail pricing, and/or other pricing information such as foreign exchange rates for independent or foreign films. These databases 252, 253, 255, 256, and 257 can be locally stored on the management server 222, or remotely connected to the management server 222. In alternative embodiments, the databases 252, and 256 can also be connected remotely to retail server 258, vendor server 262, or advertiser server 260. The master title database 255 can be used by the verification system to determine the authenticity of a media item.

Each of these servers can be connected directly or remotely to the management server 222 through the computer network 220 through wired or wireless connections. In an exemplary embodiment, the inventory database 256 would be connected and synchronized to the retailer and vendor inventory databases while the accounting database would be under the control of the kiosk destruction system. The management server 222 can accept computer readable medium 250 for running executable programs or data transferability to the local server processor (not shown) or processor 230. A Content Management System ("CMS") 251 is also connected to the management server 222 to provide for the management of incoming and outgoing digital content. In addition, the CMS 251 can also maintain and interface with the various databases and servers to ensure connections to remotely stored media and that locally stored media is up to date.

The user 201 utilizes the display 204 and/or the input device 206 to interface with the kiosk 202 to accept or deny the available destruction options. Throughout the process, the user 201 can request live support utilizing the camera 203, display 204, the input device 206, as well via the live interface 246 that communicates with the remote live support system 266 via the communication system 242 and computer network 220. It can be understood that the camera 203 can also include a microphone for voice communication. Once the kiosk 202 has performed the destruction, the user can accept a receipt from the printer 240 as initiated by the processor 230 and a photo is taken of the user. The kiosk 202 also has a control button 234 that allows the user to initiate the destruction subsystem 238 or temporarily interrupt the destruction subsystem 238. A scanner 236 allows the user 201 to scan the media item prior to inserting the media item into the media acceptance subsystem 232. If the user 201 has an identification card or other form of identification, the user can utilize the available card reader 205 to access the kiosk interface.

Figure 3:
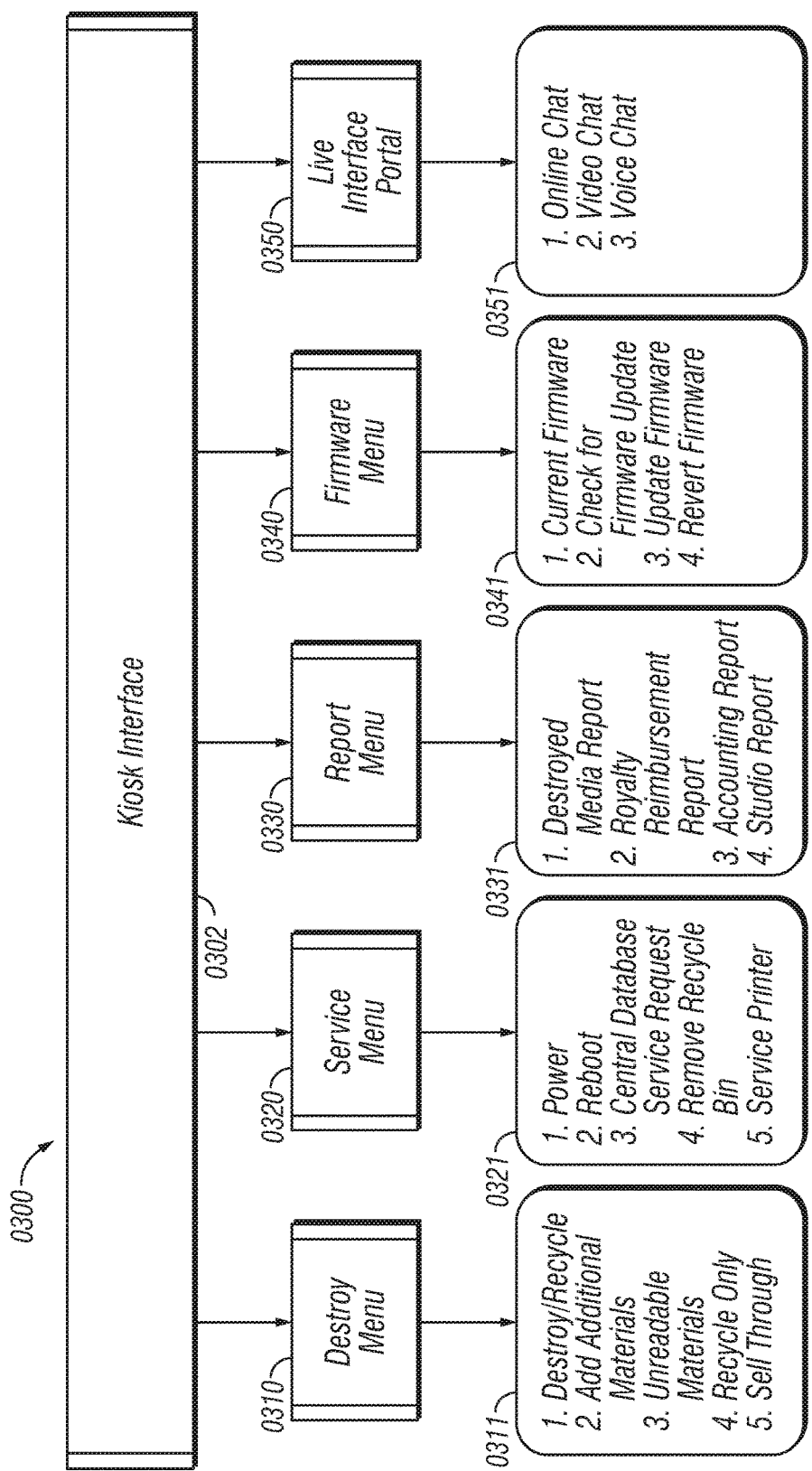
FIG. 3 illustrates the kiosk interface menu flowchart.

In FIG. 3, an illustration of the kiosk interface system 300 that includes the kiosk interface 302 is seen. The kiosk interface 302 utilizes the display (not shown) to provide information to the user and the user input device (not shown) to receive feedback from the user. A user can utilize the kiosk interface 302 to select a variety of options from the available kiosk interface menus 310, 320, 330, 340, and 350. These menus allow the user to select from various option such as, but not limited to, initiate media destruction, perform kiosk services, perform firmware service, generate reports, and interface with live support.

When a user initiates use of the kiosk interface 302, one of the menus available to them is the destroy menu 310. The user can utilize the destroy menu options 311 to initiate destroy and recycle (option 1), add additional materials to the destroy and recycle process (option 2), initiate destruction of unreadable materials (option 3), and recycle only (option 4). A user utilizing option 1 can initiate the destroy and recycle process via the destruction subsystem. Additionally, one of the options 311 in the destroy menu 310 must be selected prior to initiation of the media acceptance subsystem. Under option 2, a user can continue a destroy and recycle process by adding additional material or media items. Option 3 allows a user to initiate the destruction process for a media item that is known to be unreadable or a media item that is known to be unrecognizable by the verification subsystem, such as bonus media items or copied media. The final option in this menu is the recycle only option. In some instances, the user may want to skip the destruction process and only recycle the media item, this option is an alternative to those media items that could be destroyed under option 3. There is also option 5, in cases where after the kiosk has authenticated and checked the physical damage of the device, a user can also sell their media back to the retailer if it has a resale or secondary market store. Alternatively, if the kiosk is used by retail employees or industry employees option 5 may be removed.

The service menu 320 allows the service technician or administrator to choose from the service options 321. The first option (option 1) allows the service technician or administrator to power down the kiosk system. Option 2 allows the service technician or administrator to trigger a reboot of the kiosk system. Under the third option (option 3) the central database service request option allows the service technician or administrator to request a change to the central database add/delete users, request user reports or a repair based on an error discovered when attempting to process a request. The fourth option (option 4) allows the service technician or administrator to remove the recycle bin from the system for disposal of the recycled and destroyed media items. Option 5 allows the service technician or administrator to perform service to the printer, such as replacing paper, ink or other necessary maintenance. It should be understood that each of these requests can trigger logs or reports that can be stored locally or transmitted to the network operation center.

The kiosk system must be able to generate reports based on the media items it has processed, and the report menu 330 can be chosen from the kiosk interface 302, which has five report menu options 331. Option 1 allows the user to generate a report that provides information on the media that has been destroyed. Under option 2, there is the royalty reimbursement report, allowing the user to generate a report noting the amount of reimbursement requests made to the various studios. Option 3 allows the user to request an accounting report that indicates the amount of reimbursement requests made to each studio, the amount each studio has paid, and any media items that have been processed as sell-through. Option 4 allows the user to generate a report for the studios based on the media items destroyed.

There is also the Firmware menu 340 that allows a service technician to perform several services via the firmware options 341. These services include: current firmware (option 1), check for firmware update (option 2), update firmware (option 3), and revert firmware (option 4). Under option 1, current firmware, the service technician can check the current version of the firmware prior to performing any services to the kiosk system. For option 2 the technician can initiate a check for the latest firmware without initializing an update. This option is very useful in an environment where updates can happen almost daily. Some updates will not be required at specific locations while in other locations, an update is absolutely necessary. Under option 3 the technician can initiate a firmware update if one is available without waiting for a status check. In an exemplary embodiment there would also be a submenu that would allow the technician to lockout the kiosk until firmware update is complete. A dedicated lockout screen can be utilized to show that the kiosk is running an operation and is useable. Alternatively, there can be an option to have the kiosk appear shutdown. Additionally, either of the two previous options can be utilized with an automatic power down at the conclusion of the firmware update. If the power down option was chosen then the Network Operation Center can remotely power up or reboot the kiosk or it could be initiated upon the next opening of the retail location where the kiosk is located. Finally, there is option 4 which would allow the technician to revert the kiosk firmware to a previous version in the event that an undiscovered bug in the latest firmware comes to light after its installation. It should be understood that all of these options and services could also be performed remotely through either the management server, network operation center or the computer network.

One menu that for many users will be the most critical is the live interface portal 350. The live interface portal 350 allows a user to request live support via the live support options 351. Among the live support options 351 are online chat, video chat, and voice chat. The online chat option (option 1) allows the user to interact with live support utilizing the kiosk display and kiosk input device(s). For video and voice chat, a user can utilize the kiosk display and the kiosk camera and microphone to connect with live support through the kiosk interface 302.

Figure 4:
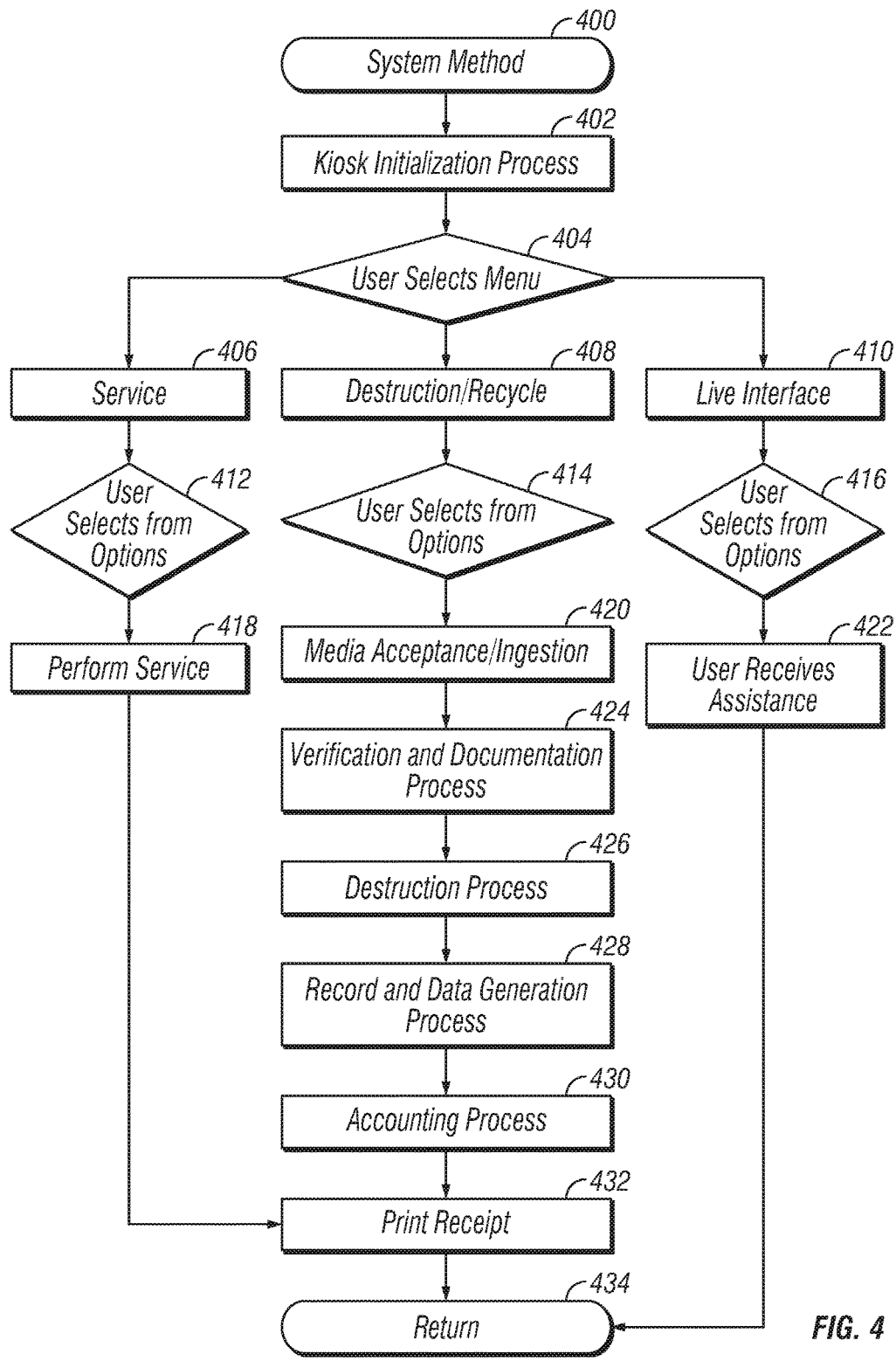
FIG. 4 illustrates the kiosk media destruction system method.

FIG. 4 illustrates the kiosk media destruction system method 400. The method 400 begins with the kiosk initialization process 402 that allows a user to wake the kiosk from a sleep or advertising state. After the initialization process 402 has been completed the user can select one of the menus 404 from the kiosk interface. A user may be required to utilize a unique service card, authentication card, pin number, or other user identification in order to proceed to step 406. The user can select from one of the services menus 406, destruction and recycle menu 408, and live interface 410. It should be noted that other menu options may also be available under the kiosk interface. From the menus the user can select an option 412, 414, 416 that allows a user to perform a service 418, initiate the media acceptance process 420 or allow the user to receive assistance from live technical support 422.

If the user is utilizing the media item destruction and recycle option 408, then after the media item has been accepted and ingested 420 by the kiosk media acceptance subsystem, the media item is then moved to the media verification and documentation process 424. The media verification and documentation process 424 verifies the media item authenticity, as well as records and documents the media item by its title, version and media type. The media item is verified through a process and subsystem that comprises an optical imaging unit, a light emitting unit, and a laser unit. Once the media item has been verified, it is then moved to the destruction process 426. During the destruction process 426, the media item is scanned to determine the specific point of destruction that will render it unusable or unreadable. Once the point is found, the media item is punctured or rendered unusable via another form of destruction at that point. The record and data generation process 428 can begin, during the destruction of the media item, and continue after the destruction of the media item. The destruction of the media item is recorded to provide proof to the studio of the destruction, and in addition, to allow the kiosk system to provide an accounting of the media processed. The accounting process 430, allows the kiosk to report the destruction of the media item to the studio, while also receiving reimbursement for the prepaid royalty on the media item. Once the accounting process 430 has completed or the user has completed their services to the kiosk, a receipt can be printed 432. In alternative embodiments of the present invention, the printer could also print any reports that are generated, on full size letter paper. After the user has completed their task, the kiosk can be returned to its waiting state, through a return 434.

Figure 5:
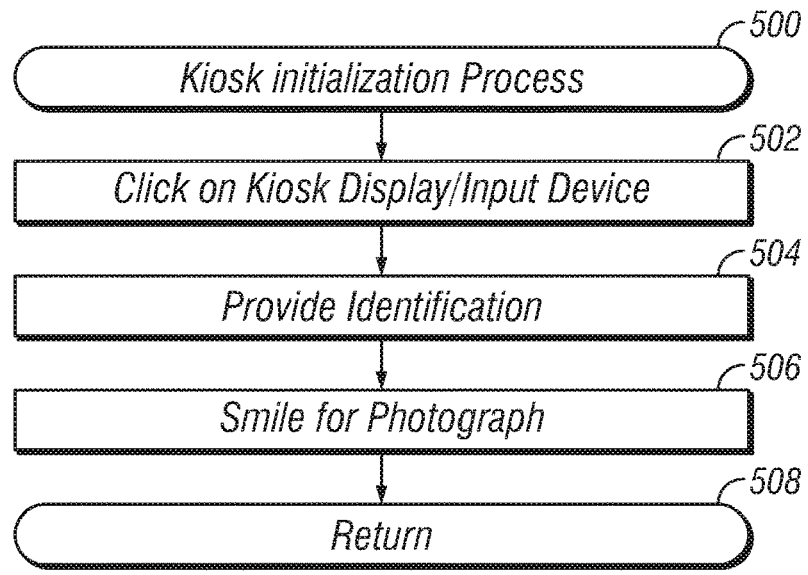
FIG. 5 shows the kiosk initialization process.

FIG. 5 illustrates the kiosk initialization process 500. In order to wake the kiosk out of a sleep or advertising state the user can click on the kiosk display or input device 502. This will trigger the kiosk to wake up out of its sleep or advertising state, much like a computer waking from sleep or a screen saver. A user will not be allowed to use the kiosk until they have provided some form of identification 504. The identification could be a driver's license, employee identification, encoded employee card, or other form of identification. Also a user may utilize the kiosk card reader, a Near-Field Communication system, Bluetooth, Wi-Fi, cell phone, tablet, watch, HID card or other means of authenticating their identification. After the user is identified, the kiosk in step 506 through the display will alert the user that their picture is about to be taken, and/or that the use of the kiosk for the remainder of the destruction and recycling, service, or live interfacing processes will be video recorded or photographed. In locations that do not require the notification or consent for audio, video, or photographic recording step 506 can be skipped. The photo or video is recorded to ensure that the person using the kiosk and generating any reports is an authorized user of the kiosk. Once the user accepts the photo, or video release then the kiosk initiation process returns 508 to the kiosk system method.

Figure 6:
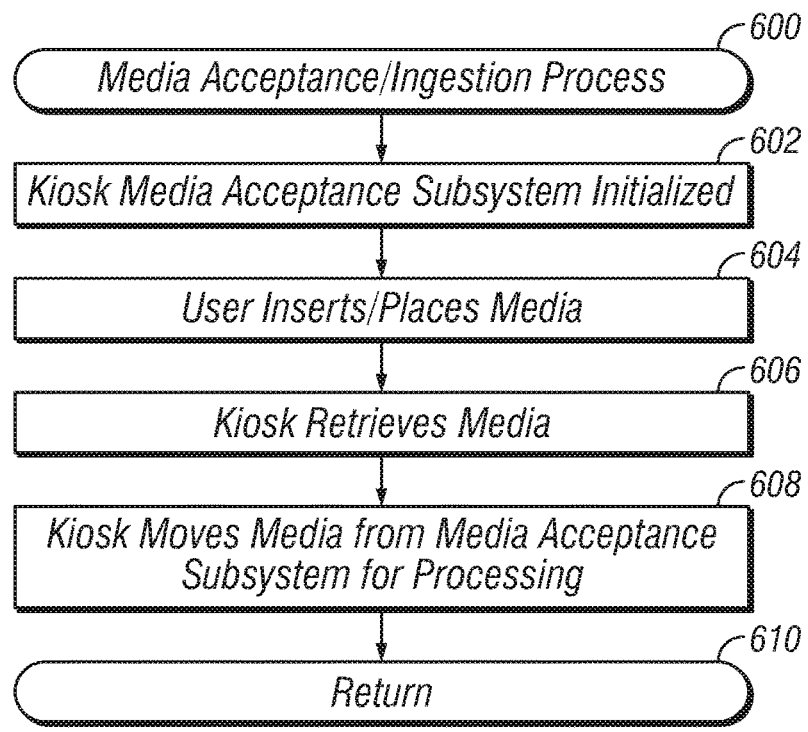
FIG. 6 shows the media acceptance and ingestion process.

FIG. 6 shows the media acceptance process 600. The kiosk system has to initialize the kiosk media acceptance subsystem 602, similar to a computer waking up a printer or other peripheral. The kiosk media acceptance subsystem initialization 602 could occur in parallel with the any of the steps listed for FIG. 5, or could occur after the kiosk user has been identified. After the media acceptance subsystem has been initialized 602, the user can insert or place the media item 604 within the media acceptance subsystem. In an exemplary embodiment of the present invention, the media acceptance subsystem has upper and lower supports that can be motorized (or not) to assist in the acceptance of the media item. The upper and lower supports provide support until the item has been transitioned to the media transfer engager. The transfer engager allows the kiosk to receive 606 the media item and assists in the shifting of the media item from the supports to the media tray, carousal or other media support system. In an alternative embodiment of the present invention, a media transfer engager is activated and exits the kiosk and allows a user to place a media item on it. Once the media item is on the media transfer engager, the transfer engager then moves back within the kiosk, and assists in the shifting of the media item from the supports to the media tray, carousal, or other media support system. In an additional alternative embodiment of the present invention, the media item can be accepted by the upper and lower supports until the media tray, carousal, or other media support system then receives it. Once the media item has been retrieved 606, then the kiosk can move the media from the media acceptance subsystem for processing 608. The move can be via a media transfer engager or movements by the media tray, carousal or other media support system. The kiosk can then return 610 to the system kiosk interface, or proceed to the next process.

Figure 7:
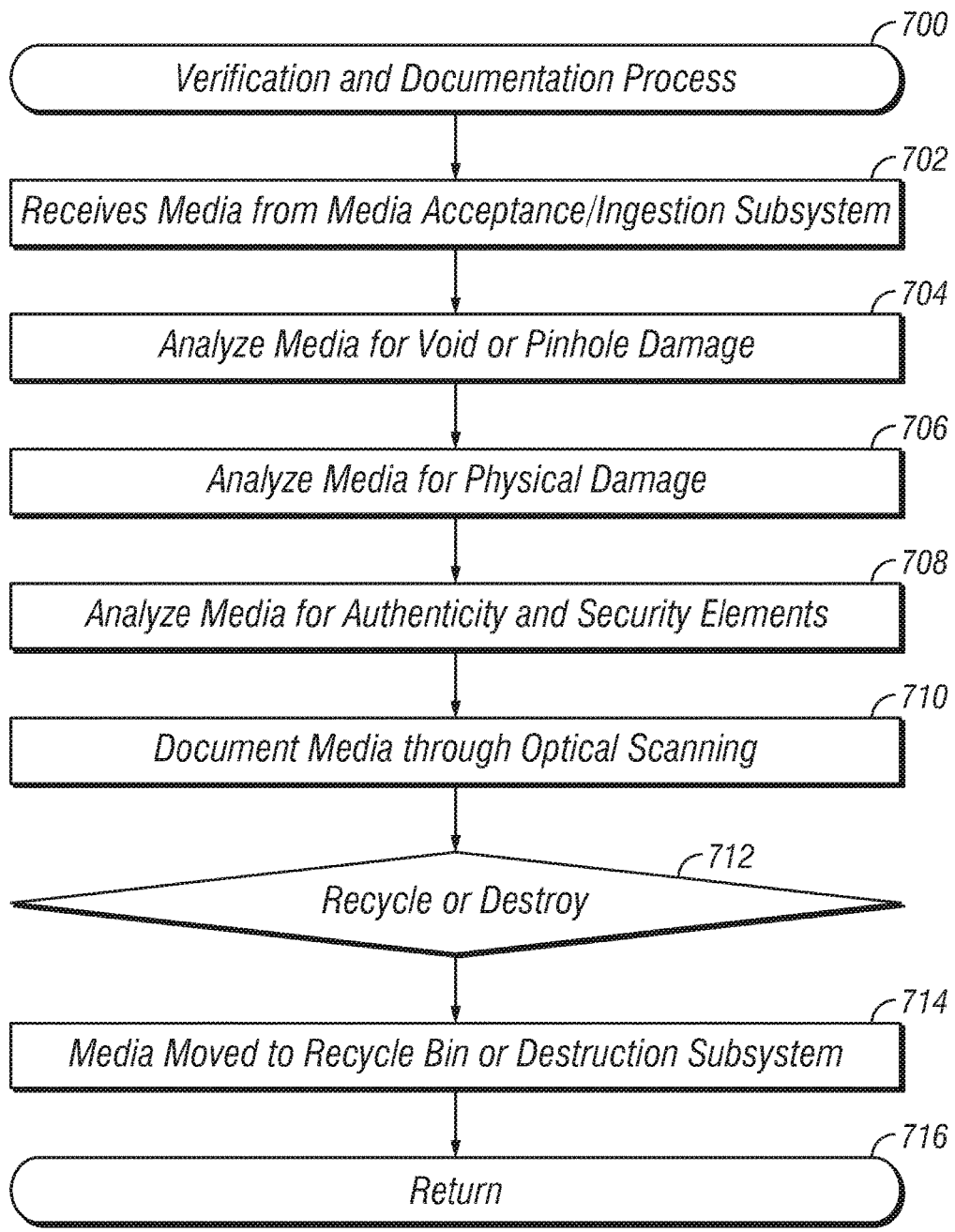
FIG. 7 illustrates the verification and documentation process.

FIG. 7 illustrates the verification and documentation process 700. The verification and documentation process 700 receives the media item form the media acceptance subsystem 702. The media item is moved via a media transfer engager or movements by the media tray, carousal or other media support system. The media item is then analyzed for void or pinhole damage 704 via an optical imaging unit, light emission source unit, and a laser unit. The media is further analyzed for physical damage 706 utilizing a unit comprising an optical imaging unit, light emission source unit, and a laser unit. The media item is also analyzed for authenticity and security elements 708, utilizing a unit comprising an optical imaging unit, light emission source unit, and a laser unit. The optical imaging unit can comprise a camera sensor with a fisheye or other wide-angle lens that will allow the unit to capture an image of a specific portion, if not all of the media item surface with one image. The light emission source unit can be comprised of, but is not limited to, LEDs, halogen, or other light emitting devices such as incandescent bulbs. The laser unit serves to assist in determining the gradient changes along the media item surface, such as scratches, marks, and other items such as holographic markers or security stripes. Once the media item has been analyzed by the different analysis steps 704, 706 and 708, the media on the media item is documented through traditional optical or laser scanning methods 710. After the media item is verified, authenticated, and documented, the user is given an option to recycle without destruction or to destroy and recycle 712. The user choosing the recycle only option from the kiosk interface can override this option. Based on this choice the media item is moved to the recycle bin or destruction subsystem 714. The move can be via a media transfer engager or movements by the media tray, carousal or other media support system. The verification and documentation process 700 returns 716 the kiosk unit to its next state.

Figure 8A:
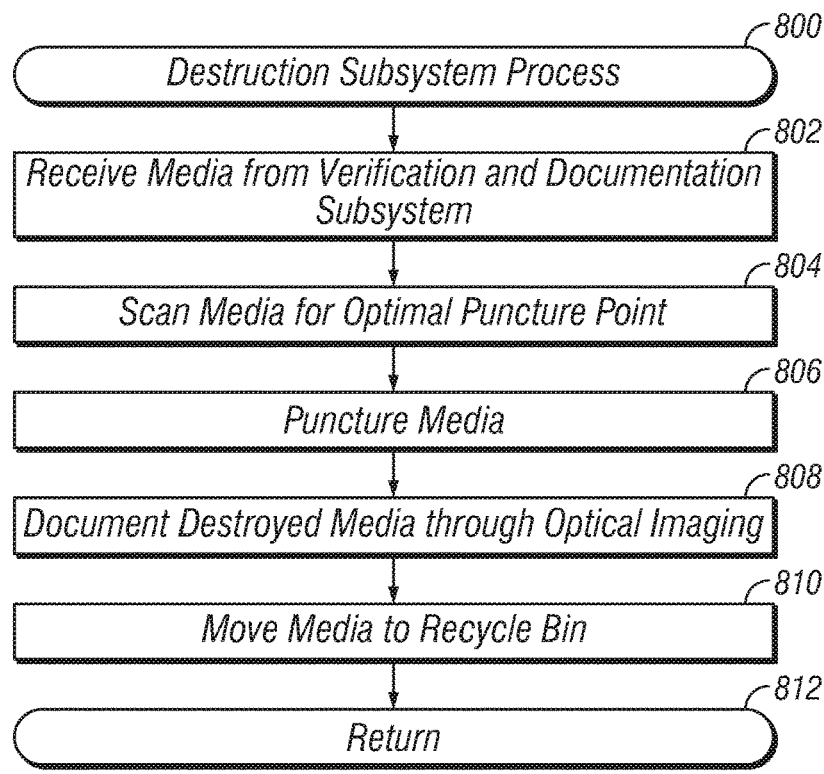
FIG. 8A shows the destruction subsystem process.

FIG. 8A illustrates the destruction subsystem process 800. The destruction subsystem process 800 receives the media item from the verification and documentation subsystem 802. The move can be via a media transfer engager or movements by the media tray, carousal or other media support system. The destruction subsystem process then scans the media for the optimal puncture or destruction point 804. Once the optimal point has been found the puncture or destruction of the media item 806 begins. The puncture or destruction can occur via a punch or other metallic objection, or alternatively through some form of cutting unit. The cutting unit could be but is not limited to, a saw blade, router bit, or drill bit. After the media item has been destroyed, the destruction must be documented through optical imaging 808. The photographic or video evidence of the destruction allows the kiosk to report the media item destruction to the studio. The destroyed media item is then moved to the recycle bin 810 and the destruction subsystem process 800 is returned 812 to the next kiosk stage.

Figure 8B:
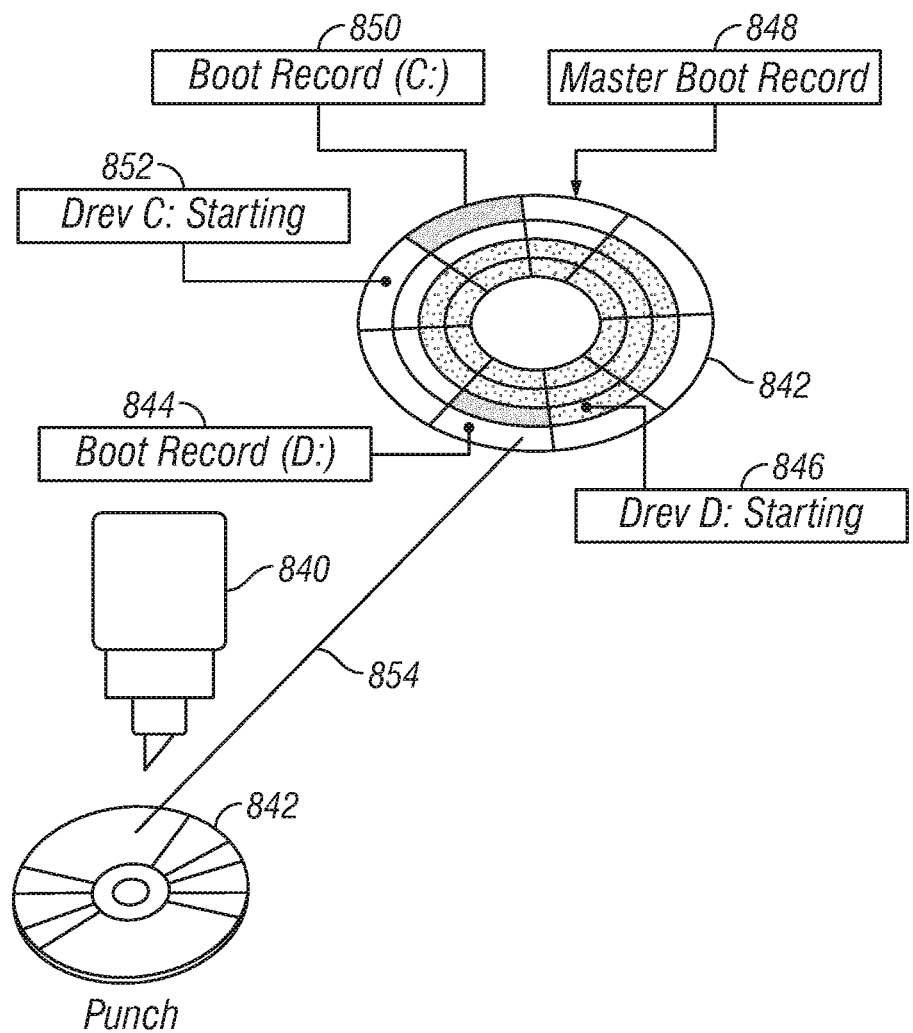
FIG. 8B shows the destruction subsystem point of destruction on the media item.

FIG. 8B illustrates the destruction subsystem process 800 point of destruction. The point of destruction is illustrated by the end points of line 854. The media item 842 is shown in a perspective (lower image of 842) and exploded view (upper image of 842). The master boot record 848 allows a disc reader to determine the data on the disc, identify the data, and what points to read specific data. For example, there could be two sections an audio (C:) and data (D:) section on the media item. Each of these sections could have their own boot records 850 and 844 that allows a reader to identify the data, the information to be conveyed by the data, and the media start and stop points. The starting points Drev C: Starting 852 and Drev D: Starting 846 are the points where the individual data sections can be found on the media item. The punch 840 is positioned by the destruction subsystem process to a point where it covers the most data sections available. The data sections of most concern are the boot records and starting points, i.e., if the identification and starting point of the data cannot be determined then the media item cannot be read. The same would be true for gaming cartridges or discs, where the punch would be positioned to cover the most data sections possible. On cartridges the punch would be on the memory card.

Figure 9:
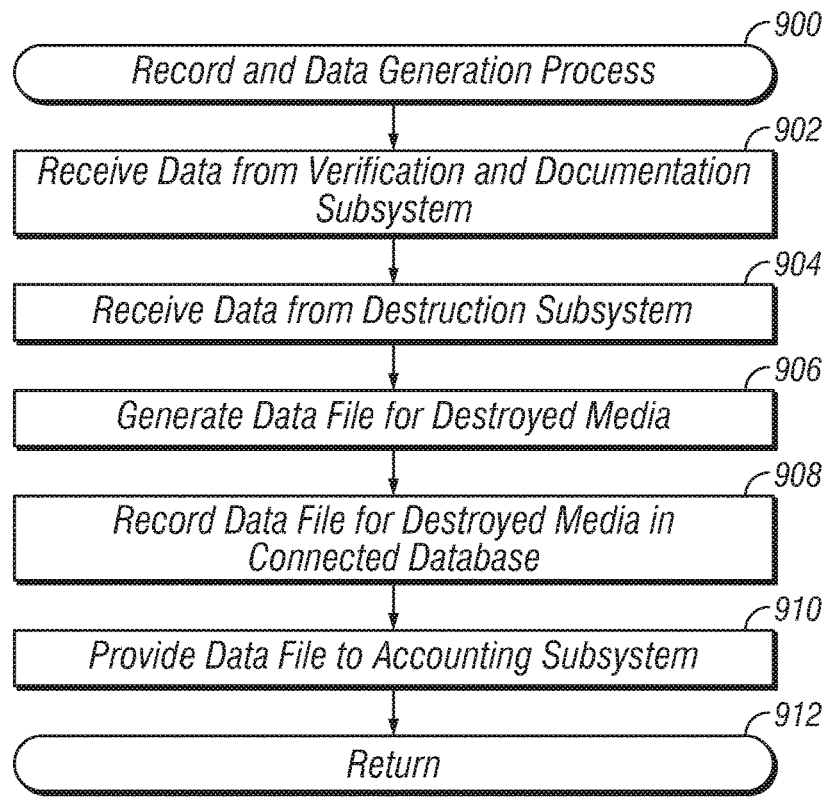
FIG. 9 illustrates the record and data generation process.

FIG. 9 illustrates the record and data generation process 900. The record and data generation process 900 receives data from the verification and documentation subsystem process 902 and receives data from the destruction subsystem 904. The media item specific information such as the authenticity, media item details, and media item identification is determined and verified utilizing the imaging and light detection head (not shown) and the verification and documentation subsystem process. The destruction subsystem provides the documentation of the media item destruction. The information is then used to generate a data file for the destroyed media 906 and the generated data file can then be used to prepare reports to the media item studios. The data file for the destroyed media is recorded in a connected centralized database 908 and the database may be controlled by the network operation center or the studio. The data file is then provided to the accounting subsystem 910 for processing of any financial information such as royalty reimbursement. The record and data generation process 900 is then returned 912 to the next stage of the kiosk system.

Figure 10:
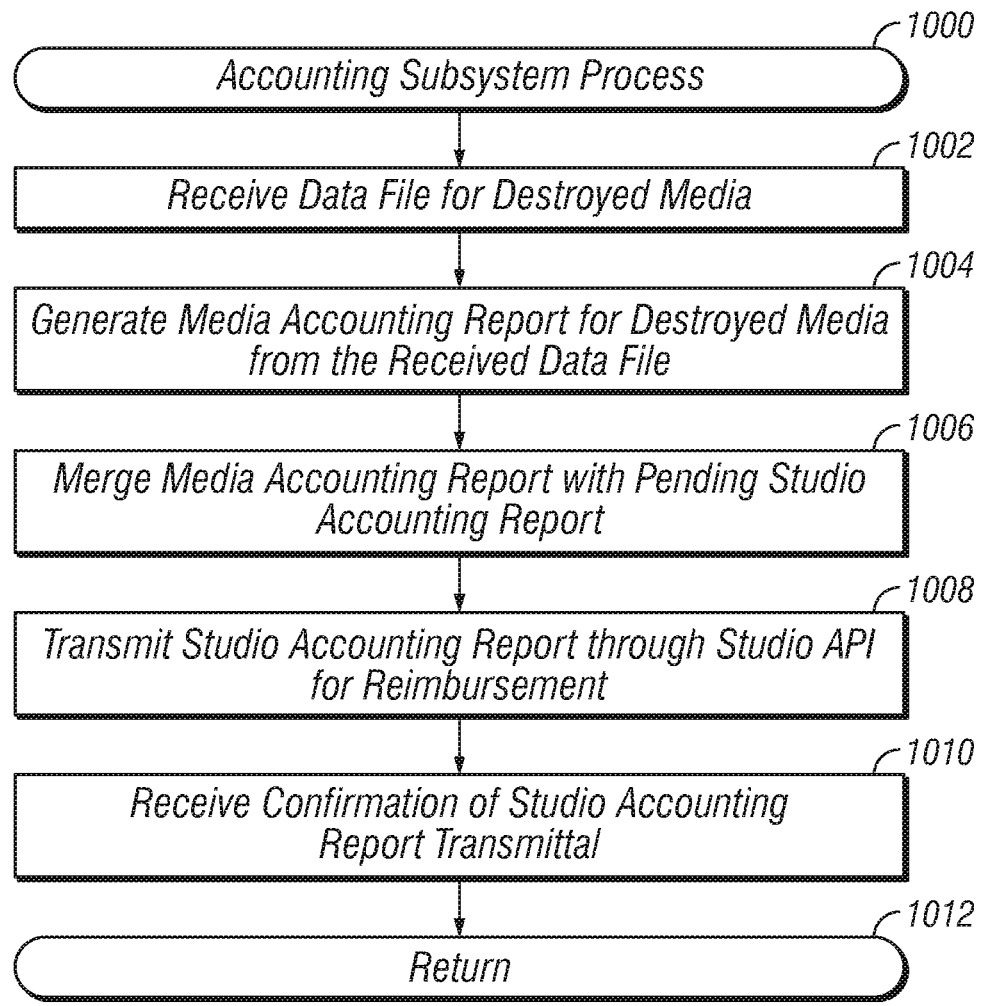
FIG. 10 illustrates the accounting subsystem process.

FIG. 10 illustrates the accounting subsystem process 1000. The accounting subsystem process 1000 receives the data file for the destroyed media 1002 from the record and data generation subsystem process. Once the destroyed media data file is received, the accounting subsystem process generates a media accounting report for the destroyed media from the received data file 1004. The media accounting report can then be merged into a larger studio accounting report that is pending delivery 1006. The accounting subsystem process can then transmit the studio accounting report through the studio specific application program interface ("API") to meet reimbursement and reporting requirements 1008. The accounting subsystem process can then receive confirmation of the studio accounting report transmittal 1010 before returning the kiosk to the next kiosk system stage 1012. It can be understood that some studios would not have a confirmation of transmittal, and in those cases the accounting subsystem process would move straight to 1012 from 1008.

Figure 11:
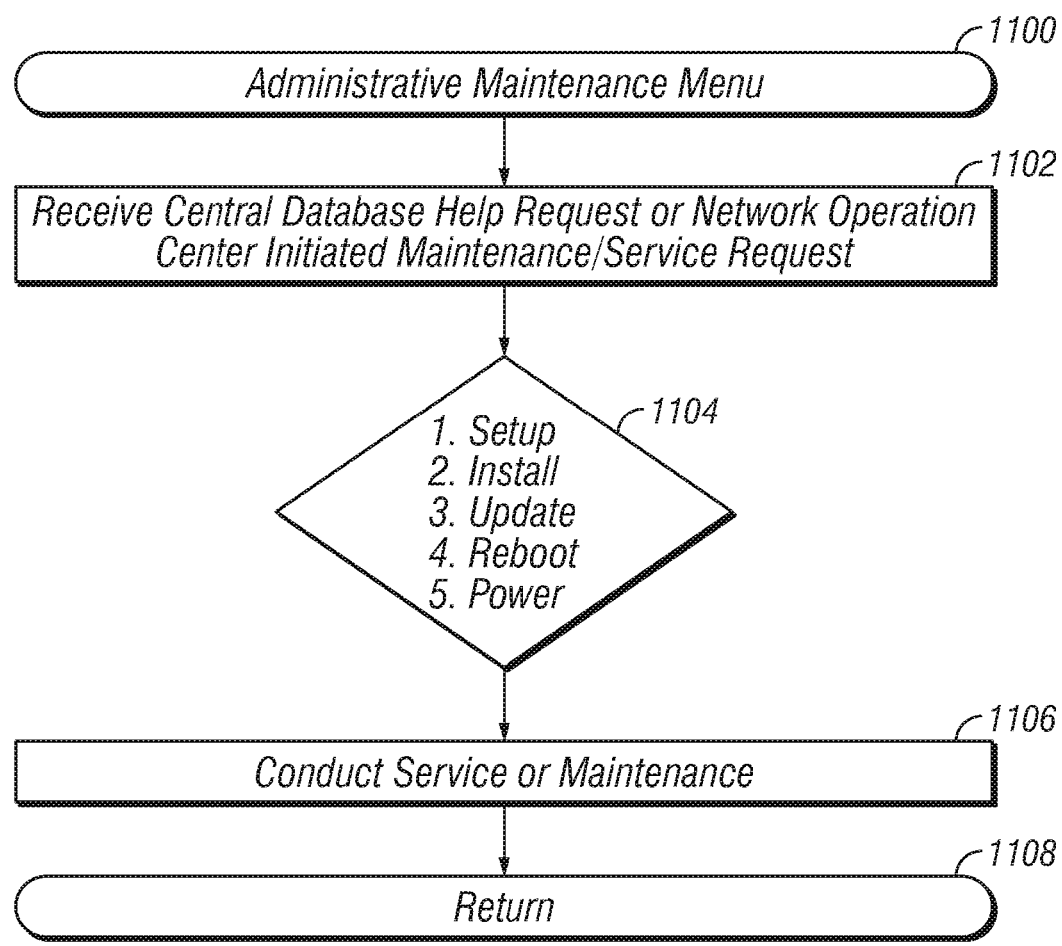
FIG. 11 illustrates the administrative maintenance process.

FIG. 11 illustrates the administrative maintenance menu 1100. The administrative maintenance menu 1100 allows the Network Operation Center to receive service requests from individual kiosks or initiate maintenance or service to all or a select number of the kiosk units in step 1102. Step 1104 provides the options for some of the various maintenance tasks that can be performed such as setup (option 1), install (option 2), update (option 3), reboot (option 4), and power (option 5). The setup option (option 1) allows the administrator to make adjustments such as modify the exchange rate for the local rewards program, the store, or retail location gift card bonus amount. Other setup options may include adjusting the menu configurations or other available options within the other menus such as adding into the exchange menu, additional exchange menu options. The administrator can also perform installations (option 2), updates (options 3), and reboots (option 4) to the kiosk interface. Installations and updates to the existing kiosk interface can include updates to firmware, software, and the installation of additional executable files. All of these operations are operations that affect the databases, including the central database, which is why they are performed by the network operation center and not at the kiosk level, though in alternative embodiments of the present invention, these operations may be performed at the kiosk level. Options 4 reboot and 5 power allow the administrator to perform power operations to the kiosk unit such as shutting it down, setting a timed power down, pre-setting a future shut down, and performing a power cycle to reset the overall system, however, it is not limited to these operations. In step 1106, the maintenance and service operations are then performed and allow the entire system to operate normally in the return step 1108. These maintenance and service operations could include the calibration of sub-assemblies, hot swapping sub-assembly, or replacement of sub-assemblies.

In alternative embodiments, the media item could include classified material that is unreadable due to security measures on the media item. For these media items, a multiple stage destruction process would be used. As an example, the punch or other destruction device may initiate destruction at two, four, or more points along the media item.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure associated with the destruction of all media. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Field of the Disclosure," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A kiosk for media destruction that comprises:
    a media acceptance subsystem having a media engager and a media tray, wherein the media engager receives a media item and transfers the media item to the media tray;
    a media verification and documentation subsystem; and
    a media destruction subsystem having an optical scanning unit for recording destruction of the media item;
    wherein the media acceptance subsystem transfers the media item between the media tray and the media verification and documentation subsystem and the media destruction subsystem for processing by one or more media processing units, the one or more media processing units including the optical scanning unit;
    wherein the media destruction subsystem physically damages the media item.

2. The kiosk of claim 1, further comprises:
    a communication system;
    a scanner for scanning the media item and a user identification;
    a user input device for receiving input from the user;
    a display for communicating information to the user; and
    a camera for recording the user's interaction with the kiosk system.

3. The kiosk of claim 1, wherein the kiosk further comprises a user interface comprising:
    a service menu;
    a destruction/recycle menu; and
    a live interface menu.

4. The kiosk of claim 3, wherein the service menu further comprises:
    a power option;
    a reboot option;
    a central database service request option;
    a remove recycle bin option; and
    a service printer option.

5. The kiosk of claim 3, wherein the destruction/recycle menu further comprises:
    a destroy/recycle option;
    an add additional materials option;
    an unreadable materials option;
    a recycle only option; and
    a sell through option.

6. The kiosk of claim 3, wherein the live interface menu further comprises:
    an online chat option;

a video chat option; and

S a voice chat option.

7. The kiosk of claim 1, wherein the media acceptance subsystem further comprises:
an upper support; and
a lower support.

8. The kiosk of claim 1, wherein the media tray further comprises:
a motor;
a plurality of gears; wherein the motor and the plurality of gears rotationally move the media tray between at least one void detection stage, at least one physical damage detection stage, and at least one storage stage.

9. The kiosk of claim 1, wherein the media tray further comprises:
a motor;
a plurality of belts; wherein the motor and the plurality of belts rotationally move the media tray between at least one void detection stage, at least one physical damage detection stage, and at least one storage stage.

10. The kiosk of claim 1, wherein the media destruction subsystem further comprises:
a scanning unit for determining an optimal puncture point; and
a puncturing unit for puncturing the media at the optimal puncture point.

11. The kiosk of claim 1, wherein the media verification and documentation subsystem further comprises:
a verification and documentation subsystem data file;
a destruction subsystem data file;
a generated data file for a destroyed media; and
wherein the generated data file is recorded in a connected database and transmitted to an accounting subsystem.

12. The kiosk of claim 1, wherein the kiosk further comprises an accounting subsystem that comprises:
a data file for a destroyed media received from a record and data generation process;
a media accounting report generated from a received data file;
a studio accounting report; and
a confirmation report.

13. A system for media destruction comprising:
a computer network;
a kiosk unit connected to the computer network, wherein the kiosk unit further comprises:
a media acceptance subsystem having a media engager and a media tray, wherein the media engager receives a media item and transfers the media item to the media tray;
a media verification and documentation subsystem; and
a media destruction subsystem having an optical scanning unit for recording destruction of the media item;
wherein the media acceptance subsystem transfers the media item between the media tray and the media verification and documentation subsystem and the media destruction subsystem for processing by one or more media processing units, the one or more media processing units including the optical scanning unit;
wherein the media destruction subsystem physically damages the media item;
a management server connected to the kiosk unit through the computer network;
a network operation center connected via the computer network to the management server;
a central database connected to the network operation center;
an accounting database connected to the management server via the computer network;
an inventory database connected to the management server via the computer network;
a retail server connected to the management server via the computer network;
a vendor server connected to the computer network;
a payment processing server connected to the computer network; and
a live support center connected to the computer network.

14. A method of media destruction via a kiosk comprising the steps:
initializing the kiosk;
engaging the media item with a media acceptance subsystem having a media engager and a media tray, wherein the media engager receives the media item;
transferring, with the media engager, the media item to the media tray;
transferring, with the media acceptance subsystem, the media item between the media tray and a media verification and documentation subsystem and a media destruction subsystem for processing by one or more media processing units, the one or more media processing units including the optical scanning unit;
verifying the media item received from the user with the media verification subsystem;
documenting the verification of the media item;
destroying the media item with the media destruction subsystem;
recording a media item destruction with the optical scanning unit;
generating a data file with the recording the media item destruction;
transmitting a generated data file to a studio for a reimbursement;
accounting for the media item destruction and the reimbursement; and
printing a receipt.

15. The method of media destruction of claim 14, wherein the initializing the kiosk further comprises the steps:
receiving input from the user;
reading a user identification;
scanning the media item;
communicating information to the user; and
recording a user interaction with the kiosk.

16. The method of media destruction of claim 14, wherein the verifying the media item received further comprises the steps:
detecting any voids in the media item;
scanning the media item for any physical damage;
reading the media item data and data structure; and
authenticating the media item.

17. The method of media destruction of claim 14, wherein the documenting the media item verification further comprises the steps:
scanning the media item for identifying markings;
verifying security markings of the media item; and
recording the identifying and security markings.

18. The method of media destruction of claim 14, wherein the destroying the media item further comprises the steps:
reading the media item;
scanning the media item;
determining an optimal destruction point; and
puncturing the media item.

19. The method of media destruction of claim 14, wherein the recording the media item destruction further comprises the step of optically recording a puncturing of the media item.

* * * * *